Figure 1:
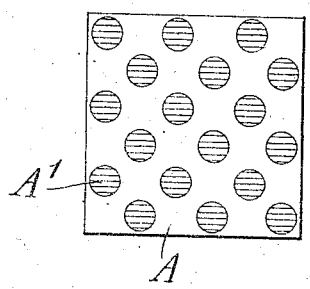
Figure 2:
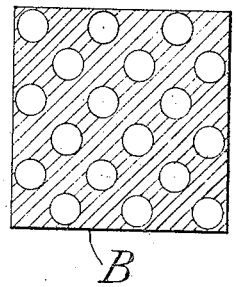
Figure 3:
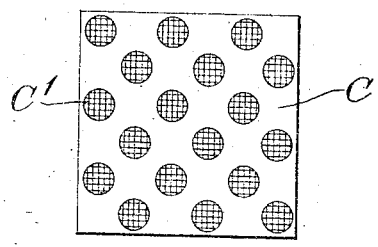
Figure 4:
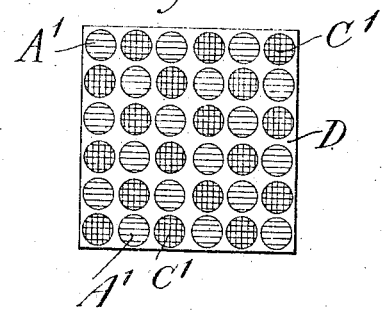

O. S. DAWSON & C. L. FINLAY.
PROCESS OF MAKING COLOR SCREENS.
APPLICATION FILED APR. 11, 1910.

1,085,727. Patented Feb. 3, 1914.

Witnesses:
T. P. Britt
E. C. Duffy

Inventors:
Oliver Samuel Dawson
Clare Livingstone Finlay
by
Attys.

UNITED STATES PATENT OFFICE.

OLIVER SAMUEL DAWSON AND CLARE LIVINGSTONE FINLAY, OF HIGH HOLBORN, LONDON, ENGLAND, ASSIGNORS TO GEORGE FREDERICK RIMELL BAGULEY, OF LONDON, ENGLAND.

PROCESS OF MAKING COLOR-SCREENS.

1,085,727.      Specification of Letters Patent.      Patented Feb. 3, 1914.

Application filed April 11, 1910. Serial No. 554,856.

*To all whom it may concern:*

Be it known that we, OLIVER SAMUEL DAWSON and CLARE LIVINGSTONE FINLAY, subjects of the King of Great Britain and Ireland, residing at High Holborn, in the county of London, England, have invented Improvements in Processes of Making Color-Screens, of which the following is a specification.

The specification of British Patent No. 19652 of 1906 granted to one of us describes a generally satisfactory method of multicolored screen manufacture according to which differently colored series of dots of microscopic dimensions and of curvilinear outline are produced in definite order and sequence one to another and to a differently colored interspacial filling. Notwithstanding the combined minuteness, intimate proximity and orderly disposition of the color elements, different screens cannot be interchanged without loss of advantage or effect where accurate registration is important, as in high class duplicating and like work such as using different screens for respectively taking and viewing or projecting. Such lack of interchangeability results from the rearranging, in the described procedure, of the relative position of a suitable dot yielding plate and the screen, between the production of each dot series whereby each shall appear in its proper relative position. Each screen is *per se* wholly satisfactory, but different ones are not, as regards their color elements, positionally identical and are therefore non-registrable.

This invention has for its object to obviate this disadvantage. A color screen made according thereto comprises several series of dots of substantially curvilinear outline and a complementary filling each transparent and differently colored and all in accurate geometric symmetrical relation, such a screen being capable of reproduction to an unlimited extent so that all reproductions shall be mutually registrable. The said geometric symmetrical relationship should be accurate within the limits of from one thousandth to one five hundredth part of an inch. It is important that although the complementary filling is in contact with the said dots there is no overlap. The several dot series can differ in area but procedure will be described wherein, as is frequent in practice, such areas are equal or substantially equal.

According to one method of carrying out the invention a foundation plate is produced capable of yielding a representation on the color screen surface of the portion corresponding to the filling and, for use in conjunction with said plate, another or supplementary plate, resulting from a stage in the production of the foundation plate, and capable of precisely registering with any one of the dot series, either on the color screen or its counterpart on the foundation plate. These two plates can be used for producing an unlimited number of color screens whose respective color elements are in identical positional relationship.

Figure 5:
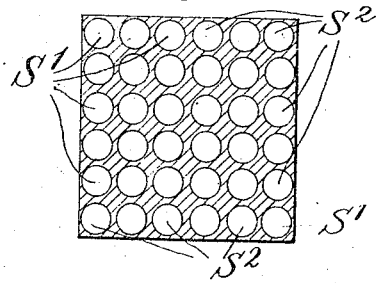

In the accompanying illustrative drawings, Figures 1 to 4 respectively show diagrammatically in exaggerated form, the character of plates or impressions occurring in the production of the foundation plate and Fig. 5 similarly represents an impression yielded by such foundation plate and forming the basis of a color screen.

A plate as A (Fig. 1) is obtained photographically from a "Levy" cross line screen by utilizing screen distance and a small circular stop in the camera and comprises symmetrically arranged opaque circular dots or patches $A^1$ collectively occupying one third or thereabout of the plate area, the remainder being transparent. Treating plate A as a negative, a positive, as plate B, (Fig. 2) is photographically produced therefrom and comprises circular transparent spaces occupying one third or thereabout of the plate area, the remainder being opaque. Such plate B is the supplementary plate. Plate B is caused to photographically yield a further negative, as plate C (Fig. 3), comprising, as plate A, circular opaque dots, termed for distinction $C^1$, of similar total area and a transparent remainder. Plate C is again sensitized, and plate B accurately superposed so that the circular spaces of the latter are intermediate and geometrically symmetrically so, of the dots of plate C. Exposure and development yields a plate D, (Fig. 4) comprising opaque images of both the dot series $A^1$ and $C^1$ together occupying two thirds or thereabout of the plate area and a transparent remainder or interspacial portion. Such a plate constitutes what is herein called the foundation plate. Color screens can be obtained by the aid of the said foundation and supplementary plates as follows:—A suitably sensitized transparent support, glass or celluloid for instance, is exposed through plate D so as to yield a practically transparent impression of the interspace or filling shown shaded in Fig. 5 and which, although regular, can never be circular, or of alternate form, elliptical for instance, adopted for the dots, but only the complement thereof. This impression is dyed with its appropriate transparent color, and the plate again sensitized, after which it and plate B are so superposed that the transparent circular spaces of the latter exactly register with one set, say $S^1$, of the circular spaces on the sensitized plate, the other series, say $S^2$, and the interspace or filling being masked by the opaque remainder of plate B. An impression is then obtained in the ordinary way and afterward dyed with its appropriate transparent color. The transparent support is now sensitized for the third time, and exposed through the back, thus yielding an impression of the second set $S^2$ of circular spaces which are afterward dyed with the remaining appropriate transparent color. Each color is protected as laid down so as to prevent its being affected by any later re-dyeing operations. A color screen thus produced can either form an integral part of a sensitive plate or film, or it can be used in conjunction with or in proximity to such a plate or film, whether for taking, viewing, projecting, or duplicating photographic impressions in colors.

What we claim is:—

1. In the art of producing regular pattern color screens comprising differently colored series of spots having substantially curvilinear outline and complementary filling in contact with but not overlapping said spots, the herein described improvement consisting in producing photographically upon the surface intended to form the color screen an impression of said complementary fillings and then producing in the vacant spaces of said filling a photographic impression of non-overlapping spots.

2. The method of making a color screen having non-overlapping color areas said areas having geometric symmetrical relationship, said method consisting in photographically producing on a transparent support a filling affording spaces having curvilinear outlines and then laying down color spots contacting with but not overlapping the outlines of said filling.

3. The method of making a color screen having non-overlapping color areas, said areas having geometric symmetrical relationship, said method consisting in photographically producing a foundation plate provided with opaque dot series and a supplementary plate having an opaque filling adapted to exactly register with any one of said dot series, then printing on a sensitized color screen plate with said foundation plate to produce a filling in one color and then printing on said screen with said supplementary plate to produce dots in a different color exactly contacting with said filling.

4. The process of manufacturing regular pattern color screens of the kind described, which consists in producing photographically upon the surface intended to form the color screen an impression that will be complementary to series of spots of circular form and then producing impressions of each such spot series.

5. In the art of producing regular pattern color screens of the kind described, the herein described improvement consisting in photographically producing on transparent material an opaque representation of a series of the required spots having substantially curvilinear outline, obtaining therefrom a corresponding negative, from said negative producing on a transparent carrier an opaque composite image of a plurality of spot series and from the resulting image on said carrier producing on the surface intended to form the color screen a non-opaque impression of the portions of said composite image intermediate of the spot series.

6. In the art of producing regular pattern color screens of the kind described the herein described improvement consisting in photographically producing on transparent material an opaque representation of a series of the required spots having substantially curvilinear outline, obtaining therefrom a corresponding negative from said negative, producing on a transparent carrier an opaque composite image of a plurality of spot series, from the resulting image on said carrier producing on the surface intended to form the color screen a non-opaque impression of the portions of said composite image intermediate of the spot series, coloring the image of said impression, and after re-sensitizing the said surface, employing said negative to admit light to the portions corresponding to one spot series and mask the remaining spot series and intermediate filling and afterward appropriately coloring the thus produced image of the said spot series.

7. The herein described improvement in the art of producing regular pattern color screens of the kind described, consisting in photographically producing on transparent material an opaque representation of a series of the required spots having substantially curvilinear outline, obtaining therefrom a corresponding negative, from said negative producing on a transparent carrier an opaque composite image of a plurality of spot series, from the resulting image on said carrier producing on the surface intended to form the color screen a non-opaque impression of the portions of said composite image intermediate of the spot series, coloring the image of said impression and after re-sensitizing the said surface employing the said negative to admit light to the portions corresponding to one spot series and mask the remaining spot series and intermediate filling, afterward appropriately coloring the thus produced image of the said spot series, re-sensitizing the surface, exposing the last series to light through the back of the screen and coloring the image produced.

Signed at London England this 14th day of March 1910.

OLIVER SAMUEL DAWSON.
CLARE LIVINGSTONE FINLAY.

Witnesses:
RIPLEY WILSON,
R. F. WILLIAMS.